(12) United States Patent
Foster et al.

(10) Patent No.: US 11,961,416 B2
(45) Date of Patent: *Apr. 16, 2024

(54) SYSTEMS AND METHODS FOR TESTING SKILLS CAPABILITY USING TECHNOLOGICALLY-ENHANCED QUESTIONS IN A COMPUTERIZED ENVIRONMENT

(71) Applicant: Caveon, LLC, Midvale, UT (US)

(72) Inventors: David Foster, Mount Pleasant, UT (US); Nat Foster, Alpine, UT (US)

(73) Assignee: Caveon, LLC, Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,762

(22) Filed: Jun. 8, 2022

(65) Prior Publication Data

US 2022/0301450 A1  Sep. 22, 2022

Related U.S. Application Data

(63) Continuation of application No. 16/217,614, filed on Dec. 12, 2018, now Pat. No. 11,386,798.

(60) Provisional application No. 62/598,037, filed on Dec. 13, 2017.

(51) Int. Cl.
*G09B 7/00* (2006.01)
*G09B 7/02* (2006.01)
*G09B 7/077* (2006.01)

(52) U.S. Cl.
CPC ............... *G09B 7/00* (2013.01); *G09B 7/02* (2013.01); *G09B 7/077* (2013.01)

(58) Field of Classification Search
CPC ............... G09B 7/00; G09B 7/02; G09B 7/06
See application file for complete search history.

(56) References Cited

U.S. PATENT DOCUMENTS

| | | | |
|---|---|---|---|
| 6,164,975 A | 12/2000 | Weingarden et al. | |
| 6,315,572 B1 * | 11/2001 | Owens | G09B 7/04 434/323 |
| 6,648,651 B1 | 11/2003 | Cadman et al. | |
| 6,704,741 B1 | 3/2004 | Lively, Jr. et al. | |
| 6,755,661 B2 | 6/2004 | Sugimoto | |
| 6,999,714 B2 | 2/2006 | Pfenninger et al. | |
| 7,099,620 B2 | 8/2006 | Miller | |
| 7,137,821 B2 | 11/2006 | Jorgensen et al. | |
| 7,286,793 B1 | 10/2007 | Miele | |

(Continued)

*Primary Examiner* — Peter R Egloff
(74) *Attorney, Agent, or Firm* — Stradley Ronon Stevens & Young, LLC

(57) ABSTRACT

Systems and processes are provided for analyzing a test taker's knowledge, skills, and cognitive function. The systems and processes include smart questions (i.e., Smart-Items) programmed with coded variables, or for multiple choice varieties, variable sets of options to cover an entire skill set being tested. The systems and processes generate questions in real time during administration of the test, by formulating and displaying, to a test taker, random combinations of a question stem and randomly-selected question components. This smart question content is unpredictably and randomly presented, as representations of the skill to be tested. The systems and processes analyze the test taker's knowledge, skills, and cognitive function about the entire domain of the skill, rather than a single fact. The systems and processes provide security to test administration.

20 Claims, 12 Drawing Sheets

(56) References Cited

U.S. PATENT DOCUMENTS

| | | |
|---|---|---|
| 7,377,785 B2 | 5/2008 | Ullman et al. |
| 7,513,775 B2 | 4/2009 | Foster |
| 7,845,950 B2 | 12/2010 | Driscoll et al. |
| 8,202,097 B1 | 6/2012 | Brittingham et al. |
| 8,229,343 B2 | 7/2012 | Driscoll et al. |
| 8,317,520 B2 | 11/2012 | Swanson |
| 8,340,568 B2 | 12/2012 | Fadel et al. |
| 8,348,674 B2 | 1/2013 | Henson |
| 8,798,520 B2 | 8/2014 | Crowhurst et al. |
| 8,834,173 B2 | 9/2014 | McKinley et al. |
| 9,384,678 B2 | 7/2016 | Tinkler et al. |
| 9,576,495 B2 | 2/2017 | Carney et al. |
| 9,684,876 B2 | 6/2017 | Agarwalla et al. |
| 2003/0232245 A1* | 12/2003 | Turak ................ G09B 7/00 429/231.95 |
| 2006/0099563 A1* | 5/2006 | Liu .................... G09B 7/02 434/350 |
| 2009/0280456 A1* | 11/2009 | Ishaq ............ G09B 19/0053 434/350 |
| 2010/0203492 A1 | 8/2010 | Nibe et al. |
| 2011/0045452 A1 | 2/2011 | Bejar et al. |
| 2014/0143011 A1 | 5/2014 | Mudugu et al. |
| 2014/0310729 A1* | 10/2014 | Chaniotakis ........ G09B 5/08 719/328 |
| 2014/0335498 A1* | 11/2014 | Muthukumarasamy ............ G09B 7/00 434/350 |
| 2015/0046792 A1* | 2/2015 | Lee .................. G06F 3/0481 715/234 |
| 2015/0056581 A1* | 2/2015 | Tai ..................... G09B 7/04 434/188 |
| 2015/0170537 A1* | 6/2015 | Super ................ A61B 5/162 434/236 |
| 2016/0035236 A1 | 2/2016 | Cui et al. |
| 2017/0092145 A1 | 3/2017 | Lin |
| 2017/0105666 A1 | 4/2017 | Lee |
| 2017/0116870 A1 | 4/2017 | Brem et al. |
| 2017/0193449 A1 | 7/2017 | Baudet et al. |
| 2018/0052818 A1 | 2/2018 | Bethard et al. |

\* cited by examiner

13 + 27 = 27

Draw a 1, 3, 5, 7-Cyclooctatetraene molecule:

SYSTEMS AND METHODS FOR TESTING SKILLS CAPABILITY USING TECHNOLOGICALLY-ENHANCED QUESTIONS IN A COMPUTERIZED ENVIRONMENT

CROSS-REFERENCE TO RELATED APPLICATION

This application claims the priority and benefit of U.S. patent application Ser. No. 16/217,614 titled "Systems and Methods for Testing Skills Capability Using Technologically Enhanced Questions in a Computerized Environment," filed on Dec. 12, 2018 which itself claims priority and benefit of U.S. Provisional Patent Application Ser. No. 62/598,037, titled "Systems and Methods for Testing Skills Capability Using Technologically Enhanced Questions in a Computerized Environment," filed on Dec. 13, 2017, the entireties of which are incorporated herein by reference.

FIELD OF THE INVENTION

The invention relates generally to the field of testing an individual test taker's knowledge, skills, and the cognitive processes by which the individual applies such knowledge and skills by using technologically-enhanced questions with computerized systems and methods. Specifically, the systems and methods of the invention provide a computer-based test platform that delivers discrete, technologically-enhanced test questions useful for analyzing acquired knowledge and comprehension by a test taker of a tested skill. The tested skill is identical for each test taker, but test questions are systematically formulated and presented in pairings of a question or statement with a response mode so the combination is entirely unique to a test-taker. This provides test security and quality of skills measurement, along with lower costs for initial development and long-term maintenance.

BACKGROUND

Over time, the testing models by which an individual's knowledge on specific subjects have been tested has generally remained the same. For example, a subject matter expert, teacher, or professor prepares a series of test questions and corresponding answers, which test knowledge on specific subjects. The questions and answers are organized into a single test of the same questions which is administered to multiple test-takers. Such fixed questions are invariant, and can be easily copied, stolen, memorized, shared, sold, etc. Furthermore, pre-knowledge of those items can be reliably used to prepare for tests and to provide an unfair advantage on tests, i.e., the ability to cheat.

Since the early 1980s, computer technology has been used in limited ways in the field of test development and administration. For example, computer-based testing is commonly used for various subject matters, such as, standardized tests for professional certification, e.g., the National Council Licensure Examination (NCLEX) and the Patent Bar Examination (Patent Bar); for graduate school admissions, e.g., the Graduate Management Admission Test (GMAT), the Graduate Record Examinations (GRE), and the Medical College Admission Test (MCAT); and for other testing and certifications at various levels of education and licensure. It has become routine for test administrators to offer year-round, computer-based testing at test centers across the country and throughout the world. While technology has improved the convenience of test-taking, the applied testing model generally performs in many of the same ways as traditional paper tests. Even with computerized adaptive testing (CAT), the adaptive nature of the test focuses on a computer system re-estimating a test taker's ability, based on the test taker's previous answers and the difficulty of questions. In other words, CAT learns about a test taker's knowledge based on answers to questions, and then presents to the test taker subsequent pre-formulated (static) questions from a test bank that correlate with the test taker's knowledge. CAT does not implement smart questions (i.e., SmartItems), randomly formulated in real time during test administration, to analyze a test taker's knowledge retention or other skills, cognitive or behavioral, as provided by the invention.

Traditional testing models have at least three significant and recognized flaws.

First, many testing models use questions or items that are limited in capability and encourage improper motivation to prepare including, for example, rote memorization. Indeed, an applicant sitting for the Patent Bar Examination could simply memorize the black letter rules, i.e., the Patent Rules (37 Code of Federal Regulations) and/or relevant chapters of the Manuel of Patent Examining Procedure (MPEP), rather than obtain the knowledge necessary to apply the rules of practice and procedure. While rote memorization can lead the test taker to passage of a test, the test taker will likely lack the fundamental cognitive skills necessary to apply the memorized information.

Second, many tests can be copied or stolen, which provide opportunities for individuals to obtain pre-test knowledge of the test, and then use that pre-test knowledge to cheat on a test. Fixed test questions and answers can be quickly learned solely to pass the test. Also, such questions and answers can be easily shared or sold over the Internet. This is a significant problem, particularly in the area of professional certification tests, but has also been the foundation of many recent teacher-based scandals in statewide K-12 educational testing. Moreover, certain test administration bodies require test takers to sign a non-disclosure agreement in an attempt to safeguard the confidentiality of the questions and answers presented on a standardized test, but violations of such agreements can be difficult to identify and require costly enforcement of rights on behalf of the test administration bodies.

Third, traditional testing models can be inequitable to some populations of test takers. Testing can be difficult for some test takers, while being easier for others, even though test takers have the same access to the content being tested, as well as the test itself. This difference has nothing to do with the content of the test, but rather the individuals taking the test, their test taking experience, socio-economic status, and physical makeup. For example, some affected individuals include the visually impaired, others are those with learning disabilities or language comprehension issues. Also, some test takers are more capable of learning tricks and cues for traditional testing models, giving those test takers a significant unfair advantage.

Consequently, there is a need for computer-based test systems and methods that: (a) use test items to measure an individual's knowledge, skills, and cognitive processes instead of his/her ability to simply memorize content for a test; (b) are secure from being copied, reproduced, and distributed; and (c) equalize the fairness of test administration for test takers.

SUMMARY

Illustrative and alternative embodiments of a computer-based test platform are provided. The platform delivers discrete, technologically-enhanced test questions for analyzing a test taker's knowledge and comprehension of a tested skill, whereby the tested skill is identical for each test taker, but systematically formulated and presented in pairings of a stem and response modes, in real time during test administration. The stem is comprised of questions or statements with alternatives for eliciting test taker responses. Each stem may be entirely unique for each test-taker, or the stem and response mode combination must be unique for each test taker, thus providing test security and enhanced measurement of a test taker's knowledge, skills, and cognitive function.

The discrete, technologically-enhanced test questions either: (1) comprise question stems combined with randomly-selected variables tied to the question stems to create unique questions that holistically test a skill, or (2) comprise question stems linked to additional question stems, wherein each individual question stem may be combined with randomly-selected variables tied to the question stems to create unique question constellations. Furthermore, the test-taker's inputs may take numerous response modes. For example, the question may present the variations as differing constellations of answer options, presented simultaneously (as with Discrete Option Multiple Choice testing or DOMC) or sequentially. In testing administration, the systems and methods of the invention process a question in a manner that tests the same skill with multiple test takers, but randomly generates and presents unique and discrete questions or statements and/or combinations of response modes and their format to each test taker. Because each question is randomly generated in real time during test administration, and is discrete and unique for each test taker, there is no advantage for someone to show or tell another person the questions or answers that were on the test. This mitigates cheating and ensures secure test administration.

By way of an exemplary, non-limiting embodiment of the invention, the invention provides a solution to the circumstance in which changes in the question stem are combined with a variation in how the response is required, including how the answer options are presented. Here, if a teacher wanted to test an individual's ability to add two-digit numbers, then the partial question stem could be prepared as "[Variable 1]+[Variable 2]=". There are 89 variables that can be randomly selected, i.e., integers between 10 and 99, and there are 7,921 unique question combinations, i.e., 89×89=7,291. The scope of variables and answers makes cheating very difficult. In this example, the method for the test taker to respond could be by selecting the correct answer, or answers, from a list of answer options, or by seeing the answer options one at a time, with "Yes" and "No" answer options, and selecting "Yes" when the correct option or options is/are displayed, and "No" when the incorrect option or options is/are displayed, or by supplying a response by typing words or characters from a keyboard.

By way of another exemplary, non-limiting embodiment of the invention, the invention provides a smart question having a complete stem, and the variability in the options can be created by simply selecting options from dozens, hundreds, thousands, or more, in an option pool. For example, the stem could be, "Identify the mammal." and the options displayed to the test taker could be 4 (i.e., one correct and 3 incorrect) selected from a list of 500 actual mammals and 5,000 actual non-mammals. The total number of potential options allows the designer to cover the skill completely, and the options presented to the test taker (whether presented sequentially or all at once) permits a reasonable response. Furthermore, the number of correct answers is not restricted to one. Indeed, there could be multiple mammals presented to the test taker.

In one embodiment, the stem, variable, or answer can be an image that does not contain any letters or numbers. In another embodiment referred to as a hot-area SmartItem, the areas of an image can comprise different stem, variable, and response elements. For such a hot-area SmartItem, the test taker's response or answer can take the form of clicking within a specific area of the image presented to the test taker.

By way of a further exemplary, non-limiting embodiment of the invention, the system of the invention comprises a computer processor, a storage device for storing and recalling stored data, a display (i.e., user interface), an applicant file, and a test file. Using the system, the test taker signs into his/her account using unique identifying credentials, which provide access to the electronically-administered test that the test taker will be taking. For each test question that is administered by the system to the test taker, the processor calls up a question having at least one variable coded into the question stem, and then randomly calls up the at least one value of the variable that is coded or linked to the question stem, both from one or more storage devices, e.g., database(s), in communication with the system. The processor then combines the randomly selected variable with the question stem, in real time at test administration, to create the test question presented to the test taker. The processor also identifies the answer(s) that is/are linked to the randomly-created question in the storage device, and, optionally, at least one incorrect answer to the test question, all from the storage device or multiple storage devices. The processor transmits the test question, the correct answer (i.e., key), and at least one answer option (i.e., correct or incorrect) to the software application. The software application then displays the question and randomly either the correct or incorrect answer option, and asks the applicant if the answer or incorrect answer option is the correct answer. For each answer option that is displayed, the test taker indicates using "Yes" or "No" answers, whether he or she believes the answer option to be correct or not, respectively. Depending on the correctness of the test taker response, the software application either: ends the question, or provides another answer option. The system can repeat this process until either: the test taker properly selects the correct answer, or wrongly selects an incorrect option as being the correct answer. In either instance, the software application may then display a new question. Often, such questions will present a large number of variations to the stem, and the response alternative will be something other than a set of multiple-choice options. For example, the question could randomly select a picture of an animal from thousands in the database, present it, and then ask the test taker to type in the name of the animal pictured in the response box provided.

In embodiments of the invention, the potential answers need not be presented in a multiple choice format. Instead, the test taker can answer in the form of: a short typed response, a longer typed response typical for an essay, the re-ordering of a list, the highlighting of the passage in text, or any other form or format.

The method and non-transitory computer readable medium integrated within the system is comprised of, first, confirming that a test taker is registered to take a test. The test commences and questions are generated. Each question is comprised of a question stem and a response alternative. The selected question stem may have at least one variable coded into the question stem, and randomly-selected variable tied to the question stem in the database. The response alternatives can also have variability coded into either the number of available options, or the number of options ultimately presented. The question stem and the variable are then presented with fixed alternatives, or combined with the random response alternative variations to create the test question presented to a test taker. Similarly, the response alternative variation can be combined with a fixed stem or a stem with at least one variable to create the question presented to the test taker. To clarify, the response alternative variations can be created from hundreds, thousands, or more, possible answer options, one or more of which can be correct options. Finally, the test question is presented to the test taker for testing purposes. The test taker reads the stem, and is then presented with a variable set of options, at least one of which is a correct option, or another way to respond, such as typing in the response. In an example with the response alternative provided in the DOMC format, if the test taker is shown the stem of the test question and an incorrect answer option and correctly responds that the combination is not correct, then the system can then pull from the data storage device and present the correct option or a second incorrect option, and, again, ask if the combination is correct. If the test taker is shown the question and the answer, and responds that the combination is correct, then the test taker can be notified that the question has been answered correctly. Conversely, if the test taker is shown the questions and an incorrect answer, and the test taker responds that the answer is correct, then the system will score the item as incorrectly answered and move on to the next question in the test.

Optionally, if the test taker is shown the question and the answer in multiple choice format and incorrectly responds that the combination is not correct, then the system can alert the test taker of the incorrectly selected answer to the question, or the system can provide the individual with a new question and incorrect answer combination so as to protect the identity of the correct answer. Such an approach provides further testing security.

In another embodiment, the system is capable of determining whether the test taker's answer is correct or not. For example, the system can determine if the reply submitted by the test taker is linked to both the question stem and the variable. If the reply is linked to both, then the system confirms that the reply is a correct answer, and the software application can display the number of correct responses.

Optionally, a time limit can be set for a test question, in which a test taker must provide a reply to a SmartItem, or, if no reply is provided, then the test question is tallied as incorrect. In another embodiment, a test taker's replies can be limited for each SmartItem.

These and other features, aspects, and advantages of the invention will become better understood with reference to the following description and the appended claims.

BRIEF DESCRIPTION OF THE FIGURES

Additional aspects, features, and advantages of the invention, as to its system, structure, components, configuration, and operability will be understood and become more readily apparent when the invention is considered in light of the following description of the figures made in conjunction with the accompanying drawings, wherein.

DETAILED DESCRIPTION

Figure 1:
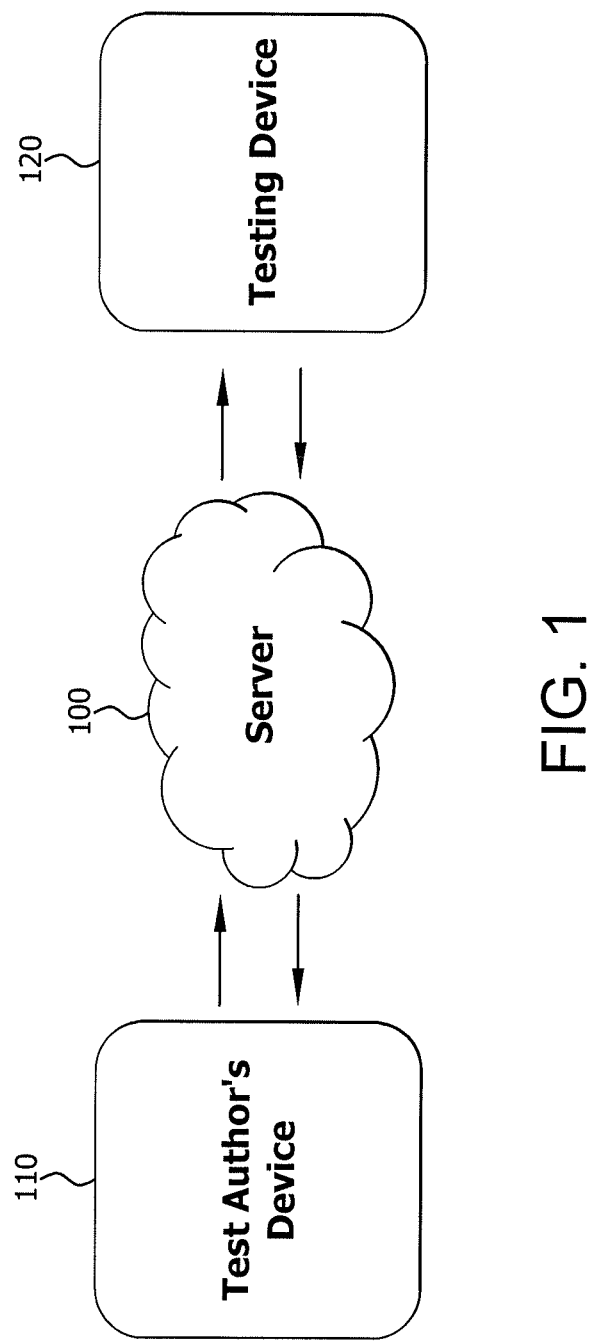
FIG. 1 shows the flow of information between components of the system of the invention.

Various embodiments of the invention are described in detail below. Although specific implementations are described, it should be understood that this is for illustration purposes only. A person skilled in the relevant art will recognize that other components and configurations can be used without parting from the spirit and scope of this disclosure.

The invention provides a solution for the present need in the test administration industry for systems and methods useful for creating, administering, and scoring dynamic, secure smart tests. The invention solves the prior art problems by using a computer-based test platform that is specially programmed to deliver unique, discrete, technologically-enhanced test questions for analyzing a test taker's knowledge and comprehension of a tested skill. While the tested skill is identical for each test taker, the test questions used to test the skill are systematically formulated and presented, in real time during administration of the test, in pairings of questions, or statements, and answer alternatives, which are entirely unique to each individual test-taker. One solution provided by the invention is testing security.

Each test question is formulated to comprise a question stem, code, and/or other design feature used to generate in real time during administration of the test, a test question or item having multiple variations. The test question is used to test an entire skill, rather than a simple slice, or part of, a skill. For example, if a student sees a similar test question twice in a row to test a skill, e.g., adding two double-digit numbers, then the first presentation of the test question can be randomly formulated as: "25+71=?", or it might be: "17+63=?". All two-digit numbers (from 10 to 99) are available to be randomly selected to appear in the first position before the + sign, and in the second position after the + sign. As a result, test takers must prepare to be tested across the entire skill, i.e., adding two double-digit numbers, rather than a single or multiple memorized static items. This meets one of the primary purposes of education—to learn a skill, rather than memorize questions and answers.

The invention provides an exam that purposefully cannot be re-created. Indeed, the traditional test development model requires teachers or subject matter experts to produce a new single slice question (or item) whenever a new exam is created. Creating, tracking, and analyzing these single items is time-consuming and wasteful to the time of teachers, subject matter experts, or psychometricians (i.e., test experts). The potential for a perpetual, smart exam, as provided by the invention, saves time, development costs, and enhances test administration efficiency and effectivity, all under the umbrella of a secure testing environment.

A detailed discussion of the systems and methods of the invention is provided below. First, a basic system overview is described. Next, a step-by-step approach to create a smart test using question stems and answer alternatives coded with variables to present discrete and unique test questions is outlined. Third, the system components are identified, followed by a description of a cloud computing system. A detailed example of identifying, creating, administering, grading, and optimizing a smart test and specific examples of question creation is next. The incorporation of additional parameters to the system is then delineated. Finally, the collection and retention of relevant data is outlined.

System Overview

The system for creating a secure dynamic test to measure an individual's knowledge or skills is provided. The system comprises:
  a display in communication with a mobile computer device or a computer device;
  a software application operating on the mobile computer device or on the computer device, the software application configured to request and receive through a wired and/or wireless communication network from a testing server located at a testing location or a remote server in communication with the testing server through the wired and/or wireless communication network;
    a question stem uploaded by an owner or author of the test or an employee, contractor, or agent of the owner or author and stored in a database of the system,
    a variable adapted to be combined with the question stem to form a complete question, previously uploaded by the owner or author of the test or an employee, contractor, or agent of the owner or author and stored in the database of the system, and
    a plurality of responses previously uploaded by the owner or author of the test or an employee, contractor, or agent of the owner or author and stored in the database of the system; and
  a processor in communication through the wired and/or wireless communication network with the software application, as well as the testing server and/or the remote server, the processer is configured to randomly call up from the database of the system upon request from the software application:
    the question stem,
    the variable, previously linked to the question stem by the owner or author of the test or an employee, contractor, or agent of the owner or author and stored in the database of the system, and
    the responses, previously linked to the question stem or the variable by the owner or author of the test or an employee, contractor, or agent of the owner or author and stored in the database of the system;
  whereby the processor is configured to:
    combine the question stem and the variable to form the complete question,
    identify the response linked to both the stem and the variable to identify an answer to the completed question, and
    communicate the completed question, and, optionally, the answer or a response to the software application;
  whereby the software application is configured to:
    display the complete question and optionally the response, and
    record the individual's reply.

Disclosed by FIG. 1 is the system that includes a server 100 comprising a processor aided by memory that communicates with a database(s). The database(s) contains question stems coded or linked with variables, responses coded or linked with the question stems and/or variables, and supersets of both incorrect and correct responses, as well as other types of response modes. The variable(s) are incorporated into the question stems to create complete questions. The database(s) can also include scoring keys, which include the correct answers to all the possible questions that may be created from the combinations of the question stems and various sources of variables in both the stems and the answer options, if the question type provides options.

The server 100 is in wired or wireless communication with a test author's device 110. The test author's device 110 includes a processor aided by memory that communicates with the server 100. The test author's device 110 also includes an author interface to permit the author to interact with the server 100.

The server 100 is also in wired or wireless communication with a testing device 130. The testing device 130 includes a processor aided by memory that communicates with the server 100. The testing device 130 also includes an testing interface on a display that is adapted to present questions to the test taker and record the responses of the test taker. The testing device may then transmit the responses back to the server 100.

The author's device includes a processor aided by memory that communicates with the server 100. The author's device 110 also includes an author interface to permit the author to interact with the server 100.

When the test taker accesses the system, the system can generate a unique test in real time and transmit test questions to the test taker's computer device or mobile computer device for display at the time of test administration. The complete question is created with stems coded or linked with variables. Potential responses, which can be correct or incorrect depending on the complete question, are also directly uploaded to and stored in the database by an owner, author, or administrator of the test, or an employee, contractor, or agent of the owner, author, or administrator. Such responses can also be coded or linked with the stem and/or the variables. In this regard, incorrect responses (i.e., those coded or linked with only the question or the variable) can be distinguished from the correct responses (i.e., those coded or linked with both the question and the variable).

The reply of the test taker may take a number of forms. Such forms may be random or fixed. For example, a response mode could be randomly selected from: a selection of multiple choice alternatives such as DOMC, a short typed response, a longer response similar to an essay answer, the re-ordering of a list, the highlighting of a passage within the text of the question, and many other response forms and formats. Alternatively, the writer could select the response mode that makes it easiest for the test taker to demonstrate his or her ability in the skill.

If the test taker responds incorrectly to the question (i.e., their reply is not linked with both the stem and variable), then the test taker can be notified that either: the response was incorrect, or the test taker will be presented additional opportunities to respond. For example, if the test taker identifies a frog as a mammal, then the test taker can be asked a second time to identify a mammal with a frog again displayed to measure whether the test taker was guessing or, in fact, thinks a frog is a mammal. After the test taker responds, he/she can be notified how his/her response was scored (i.e., correct or incorrect).

The information contained on the database related to question stem types coded with variables, variables as part of answer options, and potential correct and incorrect answer options (if multiple choice or DOMC) can be uploaded by the owner or author of the test or their employee or contractor and stored in a database of the system. Furthermore, the system can be designed to measure how long the test taker views the complete question before responding. This can be used to determine whether the test taker is attempting to cheat, does not understand the question, cannot quickly recall the knowledge necessary to answer the question, or the question requires significant time to answer. For example, a test taker who takes a short time period to read the question, but a long time period to answer the question right or wrong, could be flagged as a test taker that could be attempting to cheat.

Step-by-Step Approach

Figure 3:
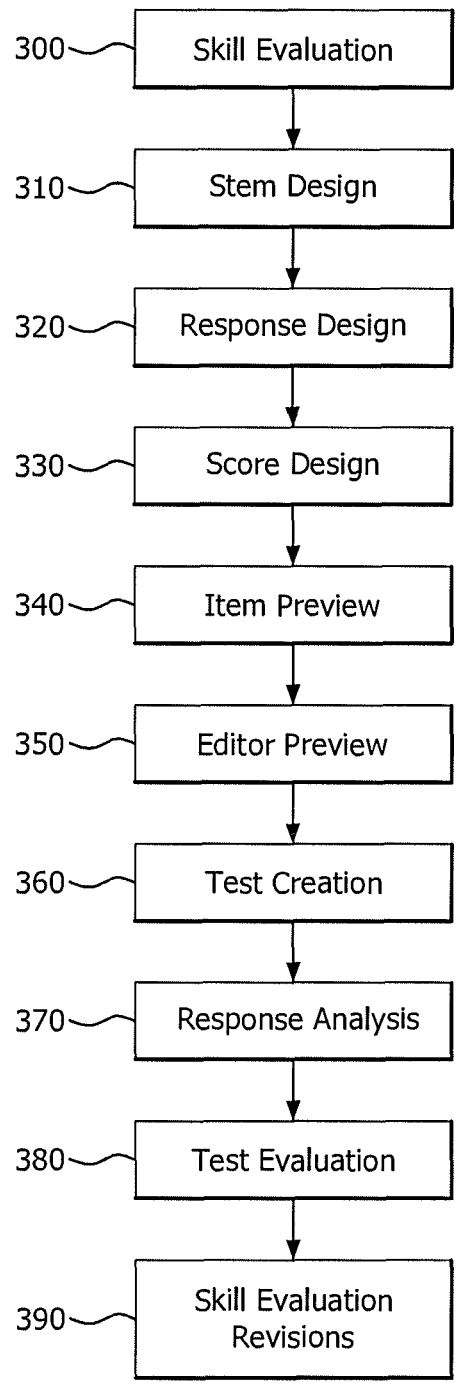
FIG. 3 shows a flow chart of an embodiment of the creation of a SmartItem of the invention.

FIG. 3 depicts a non-limiting, exemplary embodiment that includes the steps of the process of the invention. An example skill (provided below in Step 1) will be used for each exemplary step.

Step 1—Skill Evaluation 300. Evaluate the skill to be measured, also called learning or instructional objectives, competencies, proficiencies, performances, behaviors, constructs, abilities, traits, interests, or aptitudes. This evaluation is performed differently by the invention in comparison to a traditional test because the purpose of the step is to design the rules of a question or item (or more than one question or item) to measure the entire or a large portion of the stated skill. Conversely, the intent of traditional item design aims to measure a single aspect or slice of the skill, as long as it is covered by the skill. For example, the skill could be: "Know how the amendments to the Constitution and Bill of Rights protect civil liberties." A traditional design approach could be to create a question or item that measures a person's knowledge of one of the amendments, e.g., the $14^{th}$ Amendment, and then to write a question or item for the $14^{th}$ Amendment. In subsequent exams, or for practice exams, a different amendment would usually be selected. It is clear that the purpose of the stated skill or objective is that the learner should know all of the amendments relevant to civil liberties, not just a single one. When using the invention to create a dynamic single question or item (i.e., SmartItem) that covers the entire skill, the designer can consider the skill very differently. For example, how many amendments are there that are relevant to civil liberties? How can the question or item be formulated to randomly ask about each one of the relevant amendments?

Step 2— Stem Design 310. The designer designs the question stem or item stem. The designer could use programming code in the question or item stem, where the initial statements and actual task is presented, in order to vary the content of the stem when it is presented. For example, code could be written to select randomly an amendment from all relevant amendments. Amendment names and numbers could be contained in a list given in the stem code or provided in a separate file. The code could also be written to select a question to ask about the amendment, or randomly selected from a list or file. So, one version, when presented to a test taker, might ask, "How does Amendment 15 protect the rights of African Americans?" Another version might ask, "Is this how Amendment 4 protects the rights of women?" Such an item, might be able to generate many thousands of alternative and relevant "stems". Variables, such as the amendment number can be coded or linked to the stem. Finally, possible responses can be coded or linked to the stem and/or the variables.

Step 3—Response Design 320. The designer provides a way for the test taker to respond. This could be random or fixed. For example, a response mode could be randomly selected from: (1) a selection of multiple choice alternatives, (2) a short typed response, (3) a longer response similar to an essay answer, (4) the re-ordering of a list, (5) the highlighting of the passage in the text of the Constitution, and (5) any other response forms or formats. Alternatively, the designer could select the response mode that makes it easiest for the test taker to demonstrate his or her ability in the skill.

Step 4—Score Design 330. The designer determines the way(s) to score the item, establishes keys, and generates rules for scoring. For example, the designer can code or link the proposed responses so that the system evaluates the test taker's reply to determine if it is linked to both the stem and selected variable indicating a correct answer, or conversely only linked to one element, which would indicate an incorrect answer.

Step 5—Designer Preview 340. The designer could preview the test question or test item generated by the system in the same or similar user interface the test taker would see. By previewing the item several times, the designer can detect any problems with the design, and then apply the proper fixes.

Step 6—Editor Preview 350. Reviewers, editors, and other individuals analyze the test question or test item prepared by the designer. Like the designer, each reviewer needs to analyze the design and components of the item, compare with the skill, and analyze the item in functional mode with the preview ability of the software. The reviewers, which can be subject matter experts, can establish the quality of the item and its congruence with the skill. While this process exists for the traditional item, its purpose is extended for the dynamic question or item stem. The reviewers are not establishing that the dynamic question or item stem is an instance of a skill, but rather that, when given to many students, the dynamic question or item stem measures the entire skill.

Step 7—Test Creation 360. Completed and final questions or items may then be uploaded to a testing database. Such final questions may also be combined into a test and presented to test takers as properly designed to test the skills. The responses of the test-takers may be collected and uploaded to the testing database for analysis.

Step 8—Response Analysis 370. Test results provide data that can be analyzed to evaluate the quality of the dynamic question, or item stem, and its components. Traditional analyses will likely be useful, but dynamic questions or items produce new types of data, such as new kinds of responses, latencies to those responses, orders of events occurring during the item, and other data. New dynamic questions or items based analyses can be used to obtain this data.

Step 9—Test Revisions 380. As a result of the analyses, changes to the content or design of the dynamic questions or item stems can be used to optimize the test questions or test items. As a result, the dynamic questions or items can be revised to update and prepare them for continued use in the tests.

Step 10—Skill Evaluation Revisions 390. Studies can also be conducted routinely to determine or confirm the suitability of the descriptions of the skills used, the ability of the dynamic question or item to solve problems of validity, achieve better measurement accuracy, better security, greater fairness, and/or lower cost.

Rules Based Dynamic Variable-Answer Identification

Figure 4:
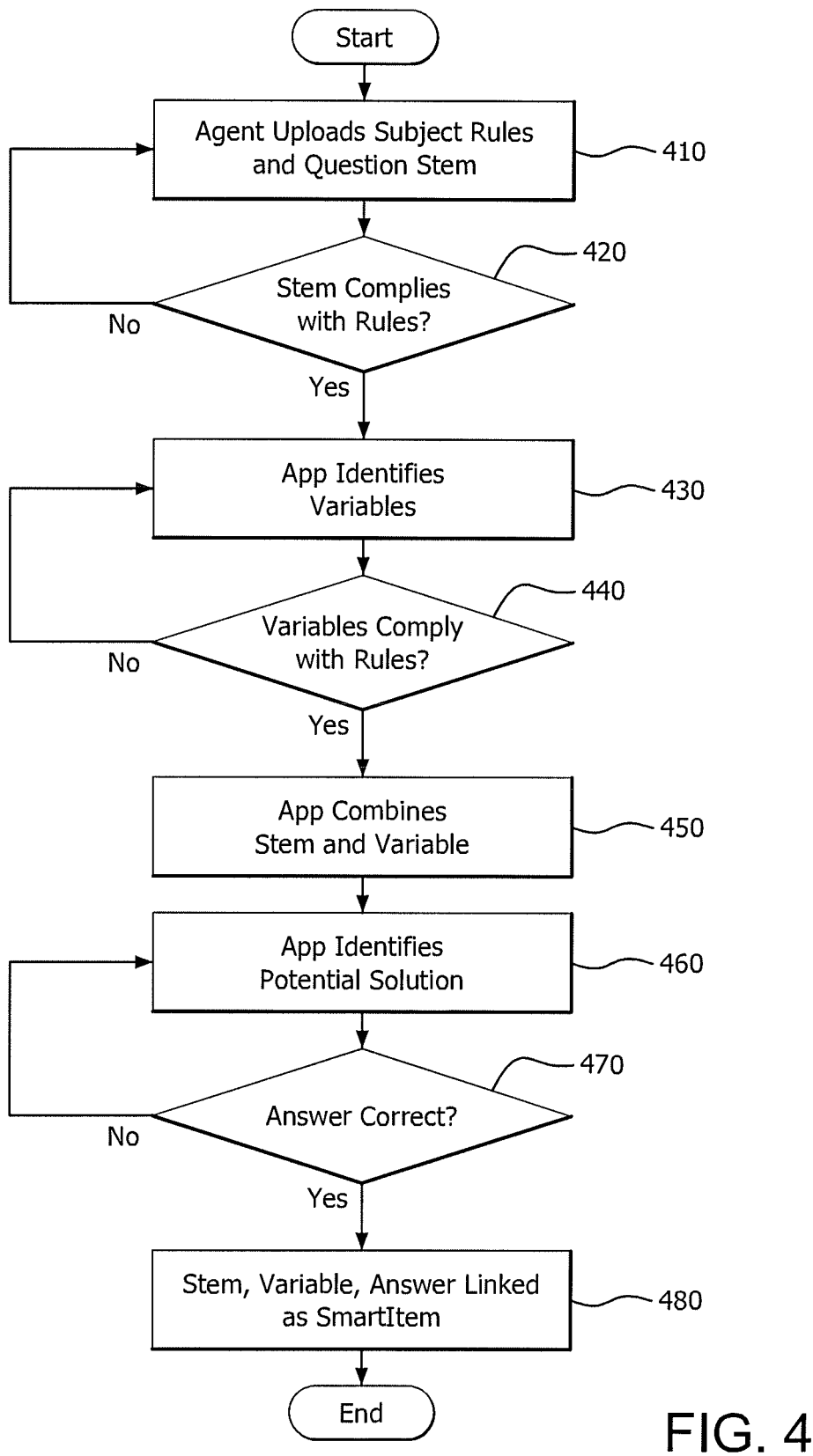
FIG. 4 shows a flow chart of an embodiment of the creation of a SmartItem of the invention.

FIG. 4 depicts one embodiment of the system in which the system automatically identifies variables to link with the stem. In such an embodiment, an author or owner of a test or an employee, contractor, or agent of the owner or author uploads subject rules and question stems 410 and stores them in the database of the system. The system evaluates whether the stems comply with the rules 420. If the stems do not comply with the rules, then the author or owner is notified of the non-compliant stems. Conversely, if the stems comply with the rules, then the system automatically searches databases or websites previously identified by the author or owner of the test or an employee, contractor, or agent of the owner or author for variables 430. The system determines whether the variables comply with the uploaded rules 440. Variables that comply with the rules are stored and variables that do not comply with the rules are discarded. Stored variables are combined with the stems to create complete questions 450. The system then searches databases or websites previously identified by the author or owner for responses to the complete questions 460. The system determines if the identified responses are correct 470. Incorrect responses can be discarded or stored on the database. In contrast, correct responses are all stored on the database and linked to the relevant stem and variable combinations 480. In this way, the system can automatically populate the database with the necessary variables and answers based on rules uploaded by the owner or author of the test.

Figure 5A:
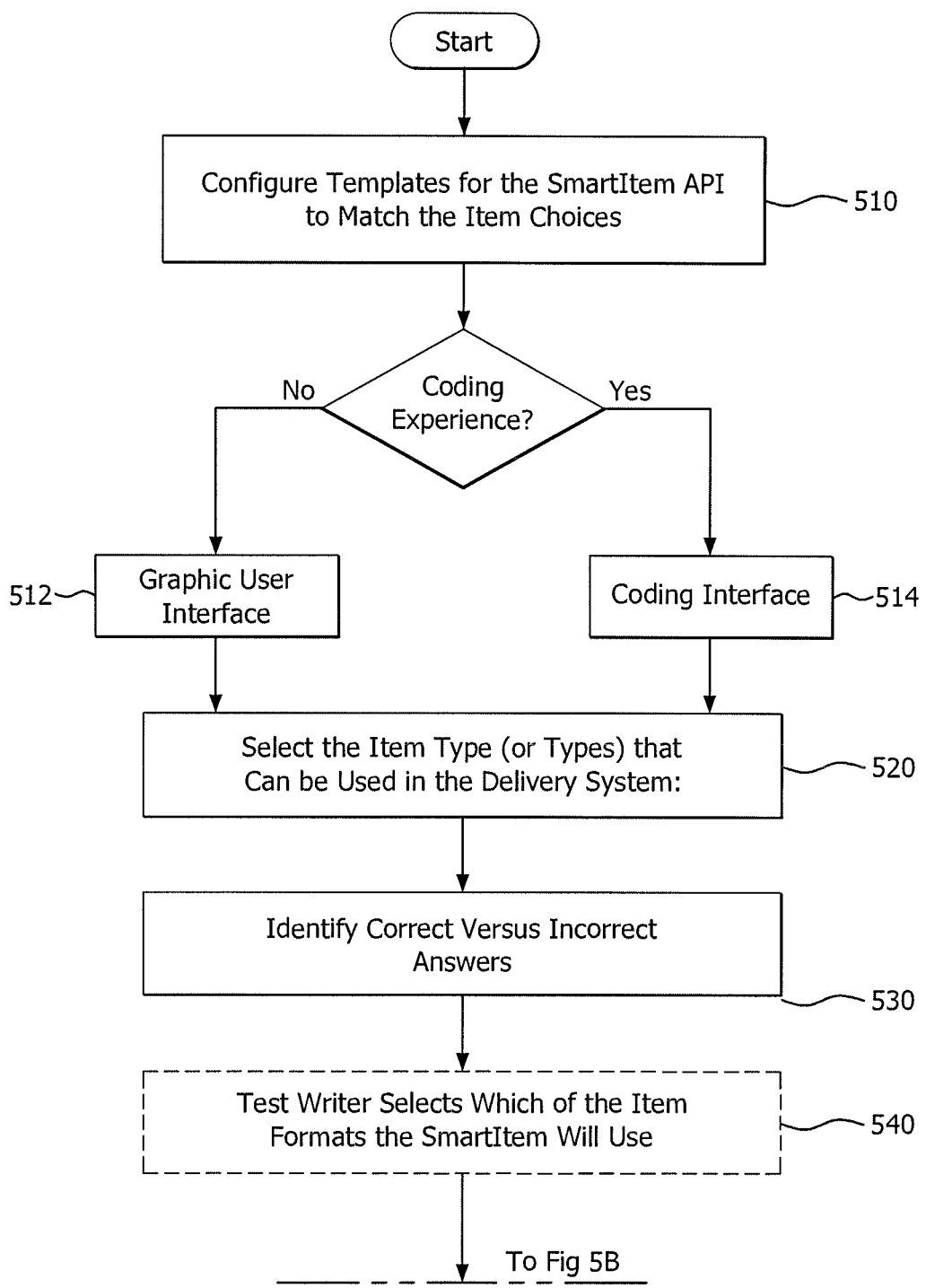
FIG. 5A shows a flow chart of an embodiment of the creation of a SmartItem of the invention.
Figure 5B:
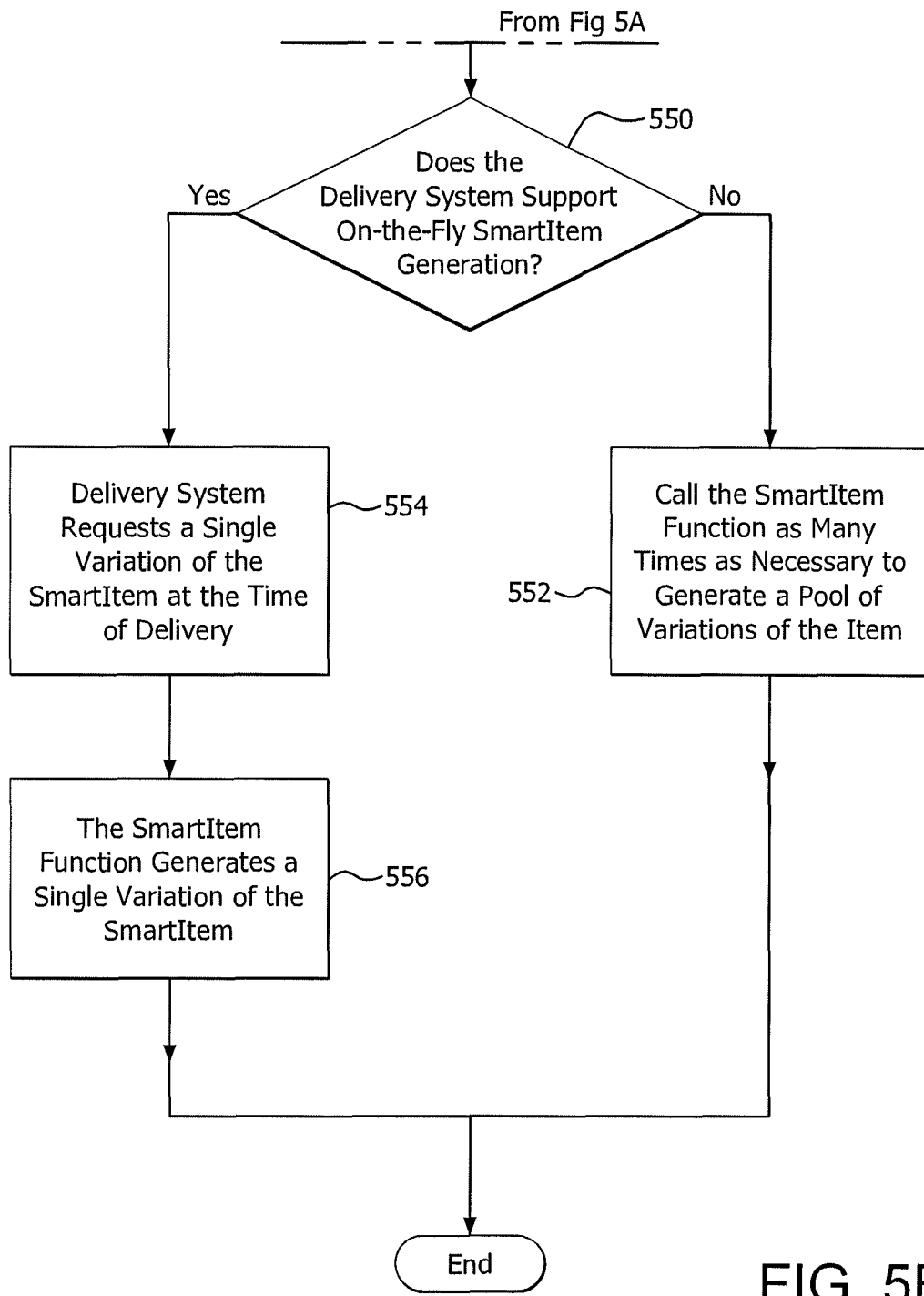
FIG. 5B is a continuation of the flow chart of FIG. 5A depicting an embodiment of the creation of a SmartItem of the invention.

FIGS. 5A and 5B depicts one embodiment of the system in which the author or owner of a test, or an employee, contractor, or agent of the owner or author codes or links stems, variables, and responses so that the same skill set may be tested using random question formats. In such an embodiment, an author or owner of a test or an employee, contractor, or agent of the owner or author first creates a skill template in a database to match a desired skill capability (e.g., adding two digit numbers, knowledge of the bill of rights, patentability analysis, etc.) 510. This template links stems, variables, and responses. To assist with template creation, a previously-created graphical user interface 512 or a coding interface 514 may be used. The choice of such interfaces may depend on whether or not the author or owner of a test or an employee, contractor, or agent of the owner or author has coding experience. After the template is created and the responses, stem, and variables are linked, the author or owner of a test or an employee, contractor, or agent of the owner or author codes or links the question formats that may utilize the template and be presented to the test-taker for response 520. Responses to the questions may take the form of selecting from a list of choices, creating short-answers, writing essays, drop-and-drag, list building, or performing simulations, which are evaluated by the processor. Such evaluation may include the use of computer vision. Next, the system identifies correct responses to stem variable combinations based on a determination, if the response is linked to both the question and variable (i.e., a correct response), versus the response being linked only to the stem or to the variable (i.e., an incorrect response) 530. Optionally, the author or owner of a test or an employee, contractor, or agent of the owner or author may restrict certain linked question formats from being presented to a certain class of test takers 540. For example, a test-taker who is blind should not be presented with a hot area question format. When the system is launched, the software determines if the testing device supports real-time generation of dynamic questions 550. If the testing device supports real-time question generation, at the time of question delivery, then the system requests a single stem and variable 554 and combines those elements and displays the randomly-generated question to the test taker 556. Conversely, if the testing device does not supports real-time question generation, at the time of test delivery, then the system requests a plurality of stems and variables and combines those stems and variables to form a question pool 552. Such pool of items can then be used to create traditional tests. For example, a randomly-selected question from the question pool may be presented to the test taker for a response.

System Components

Figure 2:
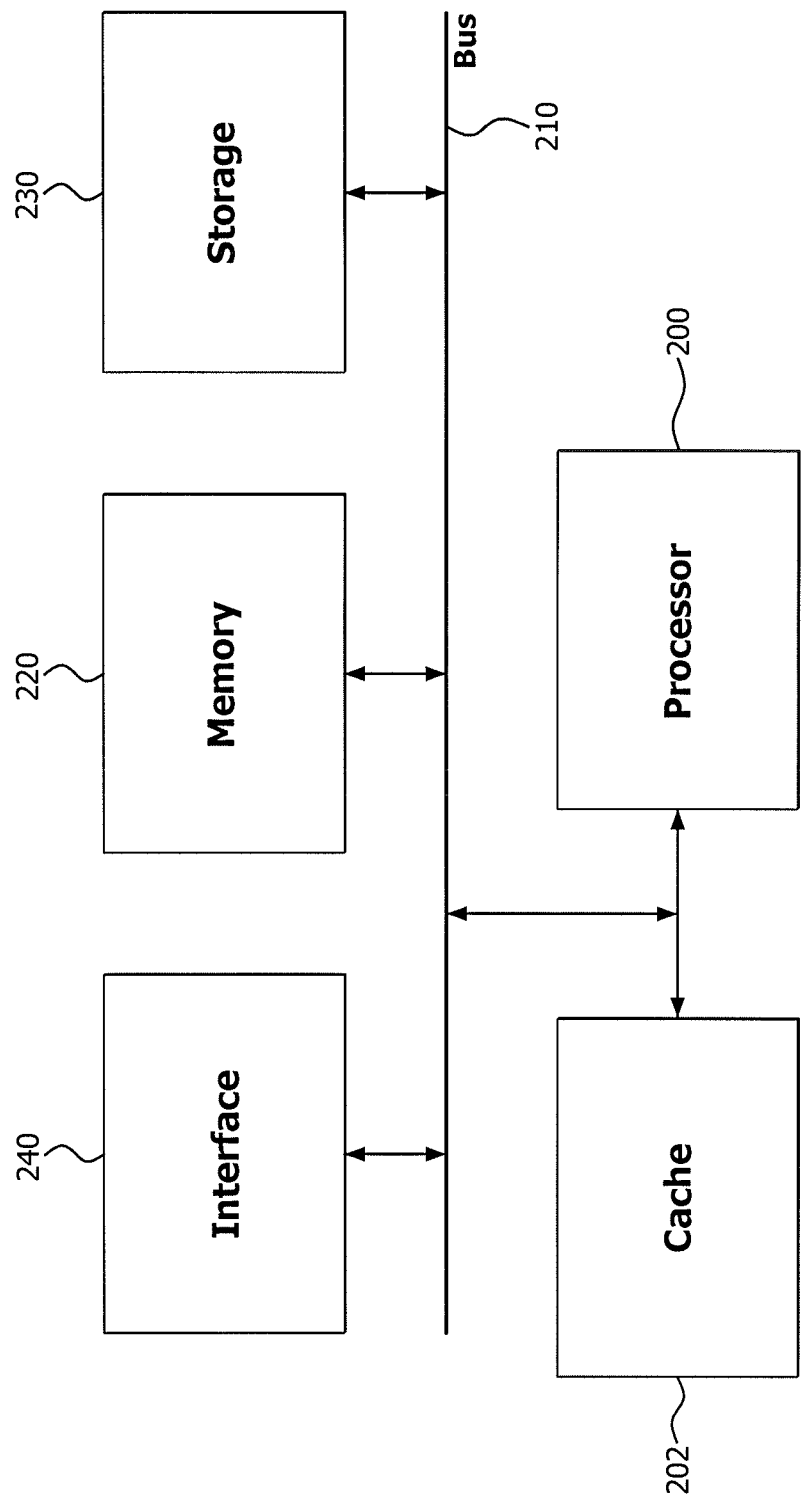
FIG. 2 shows the hardware components of the system of the invention.

FIG. 2 depicts a non-limiting embodiment of the system. Such an embodiment includes a general-purpose computing device, including a processing unit (CPU or processor) 200, and a system bus 210 that couples various system components including the system memory 220 such as read only memory (ROM) and random access memory (RAM) to the processor 200. The system can include a storage device 230 connected to the processor 200 by the system bus 210. The system can include interfaces 240 connected to the processor 200 by the system bus 210. The system can include a cache 202 of high speed memory connected directly with, in close proximity to, or integrated as part of, the processor 200. The system can copy data from the memory 220 and/or a storage device 230 to the cache 202 for quick access by the processor 200. In this way, the cache 202 provides a performance boost that avoids processor delays, while waiting for data. These and other modules stored in the memory 220, the storage device 230, or the cache 202 can control, or be configured to control, the processor 200 to perform various actions. Other system memory 220 can be available for use as well. The memory 220 can include multiple different types of memory with different performance characteristics.

Computer Processor

The invention can operate on a computing device with more than one processor or on a group or cluster of computing devices networked together to provide greater processing capability. The processor can include any general purpose processor and a hardware module or software module, stored in an external or internal storage device, configured to control the processor, as well as a special-purpose processor where software instructions are incorporated into the actual processor design. The processor may essentially be a completely self-contained computing system, containing multiple cores or processors, a bus, memory controller, cache, etc.

For clarity purposes, a non-limiting, exemplary embodiment of the system is presented as including individual functional blocks including functional blocks labeled as a "processor". The functions such blocks represent may be provided through the use of either shared or dedicated hardware, including, but not limited to, hardware capable of executing software and hardware, such as a processor, that is purpose-built to operate as an equivalent to software executing on a general purpose processor. For example, the functions of one or more processors can be provided by a single shared processor, or multiple processors. Use of the term "processor" should not be construed to refer exclusively to hardware capable of executing software. Illustrative embodiments include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, can also be used in the systems of the invention.

System Bus

The system bus can be any of several types of bus structures including a memory bus or memory controller, a peripheral bus, and a local bus using any of a variety of bus architectures. A basic input/output (BIOS) stored in ROM or the like, can provide the basic routine that helps to transfer information between elements within the computing device, such as during start-up.

Storage Device

The computing device can further include a storage device such as a hard disk drive, a magnetic disk drive, an optical disk drive, a solid state drive, a tape drive, or the like. Similar to the system memory, a storage device can be used to store data files, such as location information, menus, software, wired and wireless connection information (e.g., information that may enable the mobile device to establish a wired or wireless connection, such as a USB, Bluetooth or wireless network connection), and any other suitable data. Specifically, the storage device and/or the system memory can store code and/or data for carrying out the disclosed techniques among other data.

In one aspect, a hardware module that performs a particular function includes the software component stored in a non-transitory computer-readable medium in connection with the necessary hardware components, such as the processor, bus, display, and so forth, to carry out the function. The basic components are known to those of skill in the art and appropriate variations are contemplated depending on the type of device, such as whether the device is a small, handheld computing device, a desktop computer, or a computer server.

Although a non-limiting, exemplary embodiment described herein employs cloud computing and cloud storage, it should be appreciated by those skilled in the art that other types of computer-readable media, which can store data that are accessible by a computer, such as magnetic cassettes, flash memory cards, digital versatile disks, cartridges, random access memories (RAMS), read only memory (ROM), a cable or wireless signal containing a bit stream and the like, can also be used in the operating environment of the system. Furthermore, non-transitory computer-readable storage media, as used herein, can include all computer-readable media, with the sole exception being a transitory propagating signal per se.

Interface

To enable user interaction with the computing device, an input device represents any number of input mechanisms, such as a microphone for speech, a touch-sensitive screen for gesture or graphical input, keyboard, mouse, motion input, speech, and so forth. An output device can also be one or more of a number of output mechanisms known to those of skill in the art such as a display screen, speaker, alarm, and so forth. In some instances, multimodal systems enable a user to provide multiple types of input to communicate with the computing device. The communications interface generally governs and manages the user input and system output. Furthermore, one interface, such as a touch screen, can act as an input, output, and/or communication interface.

There is no restriction on the system operating on any particular hardware arrangement. Therefore, the basic features described herein can be easily substituted for improved hardware or firmware arrangements.

Software Operations

The logical operations of the various embodiments disclosed are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module. For example, if a storage device contains modules configured to control the processor, then these modules can be loaded into RAM or memory at runtime, or may be stored in other computer-readable memory locations. Certain embodiments can utilize any of the following programming languages: Python, Flask, jinja2, RactJS, JavaScript, Express, VM2, and ReactJS. Having disclosed some components of a computing system, the disclosure now turns to a description of cloud computing, which is a preferred operating environment of the invention.

Cloud System

Cloud computing is a type of Internet-based computing in which a variety of resources are hosted and/or controlled by an entity and made available by the entity to authorized users via the Internet. A cloud computing system is typically configured so that a variety of electronic devices can communicate via a network for purposes of exchanging content and data. The system of the invention can be configured for use on a wide variety of network configurations that facilitate the intercommunication of electronic devices. For example, each of the components of a cloud computing system can be implemented in a localized or distributed fashion in a network.

Cloud Resources

The cloud computing system can be configured to include cloud computing resources (i.e., "the cloud"). Cloud resources can include a variety of hardware and/or software resources, such as cloud servers, cloud databases, cloud storage, cloud networks, cloud applications, cloud platforms, and/or any other cloud-based resources. In some cases, the cloud resources are distributed. Cloud storage can include multiple storage devices. In some cases, cloud resources can be distributed across multiple cloud computing systems and/or an individual network-enabled computing devices. Cloud computing resources can communicate with a server, a database, and/or any other network-enabled computing device to provide the cloud resources.

In some cases, the cloud resources can be redundant. For example, if cloud computing resources are configured to provide data backup services, then multiple copies of the data can be stored such that the data is still available to the user even if a storage resource is offline, busy, or otherwise unavailable to process a request. In another example, if a cloud computing resource is configured to provide software, then the software can be available from different cloud servers so that the software can be served from any of the different cloud servers. Algorithms can be applied such that the closest server or the server with the lowest current load is selected to process a given request.

User Terminals

A user interacts with cloud computing resources through user terminals or testing devices connected to a network by direct and/or indirect communication. Cloud computing resources can support connections from a variety of different electronic devices, such as servers; desktop computers; mobile computers; handheld communications devices (e.g., mobile phones, smart phones, tablets); set top boxes; network-enabled hard drives; and/or any other network-enabled computing devices. Furthermore, cloud computing resources can concurrently accept connections from and interact with multiple electronic devices. Interaction with the multiple electronic devices can be prioritized or occur simultaneously.

Cloud computing resources can provide cloud resources through a variety of deployment models, such as public, private, community, hybrid, and/or any other cloud deployment model. In some cases, cloud computing resources can support multiple deployment models. For example, cloud computing resources can provide one set of resources through a public deployment model and another set of resources through a private deployment model.

In some configurations, a user terminal can access cloud computing resources from any location where an Internet connection is available. However, in other cases, cloud computing resources can be configured to restrict access to certain resources such that a resource can only be accessed from certain locations. For example, if a cloud computing resource is configured to provide a resource using a private deployment model, then the cloud computing resource can restrict access to the resource, such as by requiring that a user terminal access the resource from behind a firewall.

Service Models

Cloud computing resources can provide cloud resources to user terminals through a variety of service models, such as Software as a Service (SaaS), Platform as a Service (PaaS), Infrastructure as a Service (IaaS), and/or any other cloud service models. In some cases, cloud computing resources can provide multiple service models to a user terminal. For example, cloud computing resources can provide SaaS and IaaS to a user terminal. Cloud computing resources can provide different service models to different user terminals. For example, cloud computing resources can provide SaaS to one user terminal and PaaS to another user terminal.

User Interaction

In some cases, cloud computing resources can maintain an account database. The account database can store profile information for registered users and/or test takers. The profile information can include resource access rights, such as software the user and/or test taker is permitted to use. The profile information can also include usage information, such as computing resources consumed, data storage location, security settings, personal configuration settings, etc. In some cases, the account database can reside on a database or server remote to cloud computing resources, such as, servers or databases.

Cloud computing resources can provide a variety of functionality that requires user interaction. Accordingly, a user interface (UI) can be provided for communicating with cloud computing resources and/or performing tasks associated with the cloud resources. The UI can be accessed via an end user terminal in communication with cloud computing resources. The UI can be configured to operate in a variety of client modes, including a fat client mode, a thin client mode, or a hybrid client mode, depending on the storage and processing capabilities of cloud computing resources and/or the user terminal. A UI can be implemented as a standalone application operating at the user terminal in some embodiments. In other embodiments, a web browser-based portal can be used to provide the UI. Any other configuration to access cloud computing resources can also be used in the various embodiments.

Example

This example is provided for the purpose of illustration only, and the subject matter is not limited to this example, but rather encompasses all variations which are evident as a result of the teaching provided herein. The example can be implemented with regard to a test administered at a testing location.

The testing location includes a general-purpose computing device, software application, an Internet access point, and/or at least one database. The general-purpose computing device can be a portable personal device, such as, a mobile phone, smart phone, or tablet. The Internet access point can be a wireless access point.

Account Login

The individual begins by visiting a website or loading a computer application. A server determines if this is the first visit by the general-purpose computing device. If the server determines that this is a subsequent visit by the general-purpose computing device, then prior general information (e.g., name, contact information, test to be administered, etc.) is loaded. If this is the first visit by the general-purpose computing device, then relevant information (e.g., name, contact information, test to be administered, etc.) is collected, or the test taker may proceed with the test.

Determination of Skills to be Tested

After the individual logs into an account or selects a test to be administered, the skills to be tested are identified. Such skills may be identified by the individual testing program, a certified testing authority (e.g., the Association of American Medical Colleges who administer the Medical College Admission Test®), or a third party. The levels of the skills to be tested can be updated as the individual proceeds through the test, as in a computerized adaptive test. The skills to be tested can be updated on a set schedule, or in real time during test administration.

Creation of Smart Questions

Once the skills to be tested are determined, smart questions (i.e., SmartItems) are created. These smart questions are a combination of a question stem combined with at least one variable tied to the partial question stem, both of which are stored on a database and accessed by a processor of the system. The question stems, based directly on the skills to be measured, are selected at random. This way a question stem can be presented as a test question, first, for one test taker, whereas the same partial question stem can be presented last to another test taker. After the partial question stem is selected, at least one variable tied to the partial question stem is selected at random. The variable is then combined with the partial question stem to create the test question or test item, i.e., smart question or smart item. With enough stems and variables, along with SmartItem features, such randomization can provide that no two tests will ever be the same. Furthermore, hacking the database to obtain all the question stems and variables provides no benefit because the questions are randomly created and presented. Knowing the contents of the database provides no hints as to how questions will be formatted or presented to the test taker.

Identification of the Answer

Once the smart question is created, the answer is supplied by the test taker or identified by the test taker. All of the potential responses to all the potential questions can be stored in one database, or on multiple databases. Once the smart question is finalized (i.e., the variables are combined with the partial question stem), the specific correct and incorrect answer to the unique smart question can be identified by determining which of the potential responses are linked to both the stem and the variable. Again, these potential responses are stored on a database and accessed by a processor. Conversely, a reply can be supplied by the test taker in a short-answer text box or as an essay response and compared to potential responses, and the reply can be scored based on whether it more closely matches a stored response linked to both the stem and variable (i.e., a correct answer) or a response linked to only one of the stem or of the variable (i.e., an incorrect answer).

In identifying the answer, additional related correct and incorrect answer options can also be selected at random to be presented to the test taker.

Progression of Question/Answer

Once the question is identified, a response is required of the test taker. Indeed, responses to the smart question can take many forms. For example, the smart question may: (1) require a selection of multiple choice alternatives, one of which is the answer, and the rest of which are incorrect answer options, (2) require a short typed response which must incorporate certain relevant words to be deemed correct, (3) require a longer response similar to an essay answer, (4) require the re-ordering of a list wherein the answer is the correct order of the list, or (5) require the highlighting of a specific passage in the smart question.

Such unique response requirements provide an added layer of security for the test and can also protect against cheating. The test taker's responses are transmitted back to the database to be stored and can be submitted for further analysis by the system.

Collection of Data

In some configurations, during the testing described above, a storage device or resource can be used to store relevant data transmitted from the test taker's device to a database over a wired or wireless communication network. For example, how long it takes to read and process the question stem or item stem can be captured, along with the latencies for responses to any option presented or to supply a response, or to record the order that events occurred when each question was presented. The data stored can be incorporated into the disclosed system and methods to refine the testing experience or evaluate security. In addition, collected data can be used to evaluate smart questions described above. As a result, smart questions can serve more than one purpose, e.g., quality of measurement, better security, more fairness, quality of teaching instruction/curriculum, and others. Those purposes can be routinely evaluated.

Question Formats

Multiple Choice Format

Figure 6A:
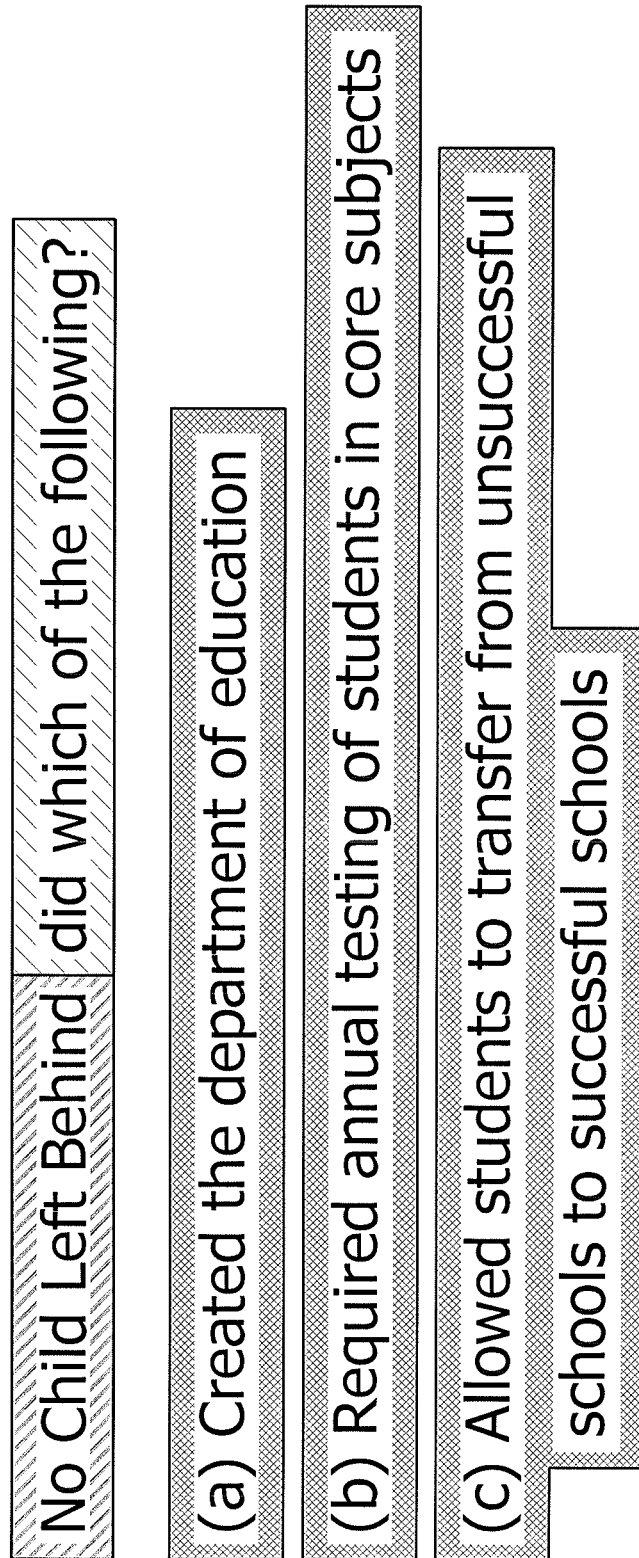
FIG. 6A shows an embodiment of a DOMC format SmartItem of the invention as it will be displayed during a test with the variable identified by the shading proceeding up and to the right, the stem identified by the shading proceeding up and to the right, and the answer identified by the cross hatching.

FIG. 6A shows a non-limiting embodiment of a type of question of the invention. In this non-limiting, exemplary format, the stem and variable are combined to create a complete question. Next, a response linked to both the stem and variable (i.e., a correct answer) along with at least one additional response linked to either the stem or variable (i.e., an incorrect answer) are presented to the test taker. Such presentation may occur sequentially (i.e., one at a time) or all at once. The test taker's reply takes the form of selecting if a proposed response is correct or incorrect, or selecting one of the plurality of potential responses displayed.

Text Entry Format

Figures 6B, 6C:
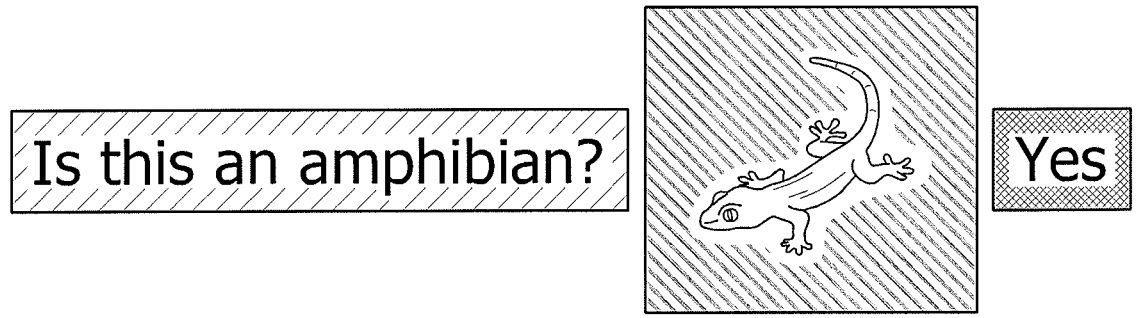
FIG. 6B shows an embodiment of a text entry format SmartItem of the invention as it will be displayed during a test with the variable identified by the shading proceeding up and to the right, the stem identified by the shading proceeding up and to the right, and the answer identified by the cross hatching.
FIG. 6C shows an embodiment of a Boolean format SmartItem of the invention as it will be displayed during a test with the variable identified by the shading proceeding up and to the right, the stem identified by the shading proceeding up and to the right, and the answer identified by the cross hatching.

FIG. 6B shows a non-limiting embodiment of a type of question of the invention. In this non-limiting, exemplary format, the stem and variable are combined to create a complete question. Next, a response linked to both the stem and variable (i.e., a correct answer) is identified by the system, but not presented to the test taker. The test taker's reply takes the form of entering letters or numbers into a dialogue box. The test taker's reply is then compared to the identified answer to determine if the test taker's reply is correct.

Boolean Answer Format

FIG. 6C shows a non-limiting embodiment of a type of question of the invention. In this non-limiting, exemplary format, the stem and variable are combined to create a complete question. Next, a Boolean response (e.g., "Yes" or "No", or "True" or "False") linked to both the stem and variable is identified by the system, but not presented to the test taker. The test taker's reply takes the form of selecting one of the Boolean responses. The test taker's reply is then compared to the identified answer to determine if the test taker's reply is correct.

Jeopardy Approach

Figure 6D:
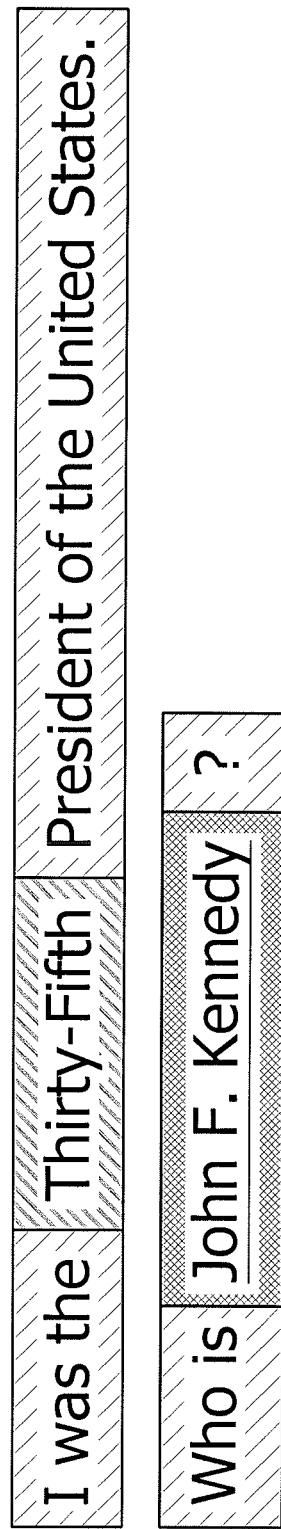
FIG. 6D shows an embodiment of a Jeopardy® format SmartItem of the invention as it will be displayed during a test with the variable identified by the shading proceeding up and to the right, the stem identified by the shading proceeding up and to the right, and the answer identified by the cross hatching.

FIG. 6D shows a non-limiting embodiment of a type of question of the invention. In this non-limiting, exemplary format, the manner by which the test questions or test items and answer options are presented to the test taker are reversed. Specifically, the answer and stem can be presented to the test taker, who must then determine what variable is linked to the answer and question.

Hot Area Format

Figure 6E:
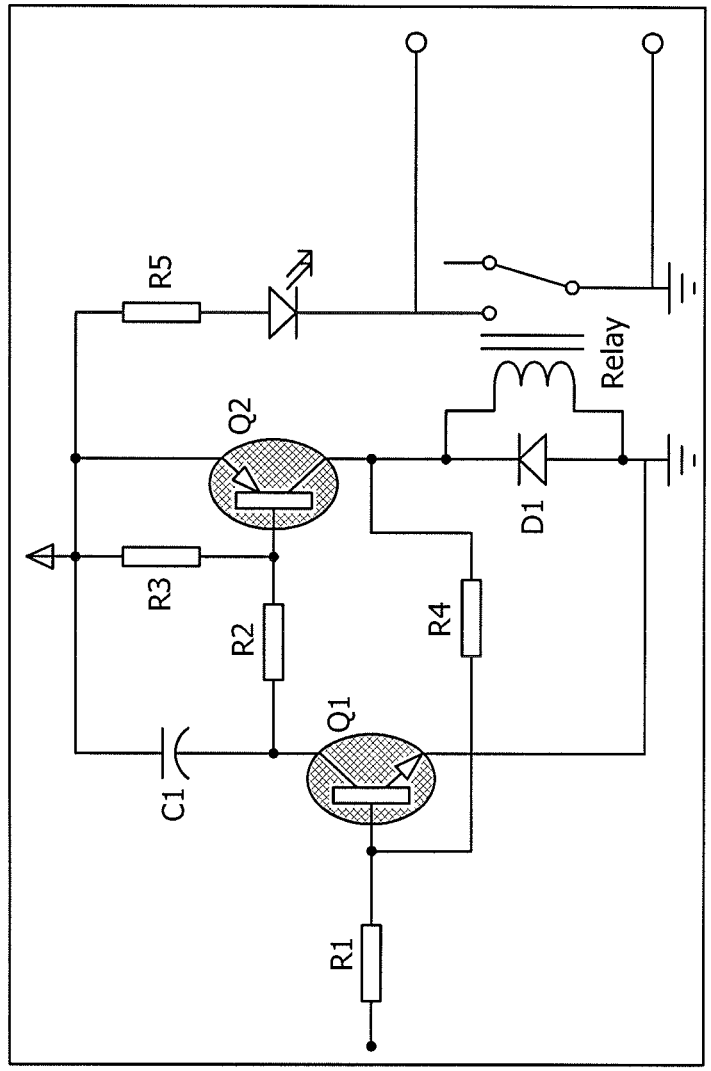
FIG. 6E shows an embodiment of a hot area format SmartItem of the invention as it will be displayed during a test with the variable identified by the shading proceeding up and to the right, the stem identified by the shading proceeding up and to the right, and the answer identified by the cross hatching.

FIG. 6E shows a non-limiting embodiment of a type of question of the invention. In such a non-limiting exemplary format, the stem or variable can be an image with specific areas of the image linked to different stems or variables. The test taker's reply takes the form of selecting an area of an image, and the system determines if the area identified by the test taker is linked to both the variable and the stem.

List Format

Figures 6F, 6G:
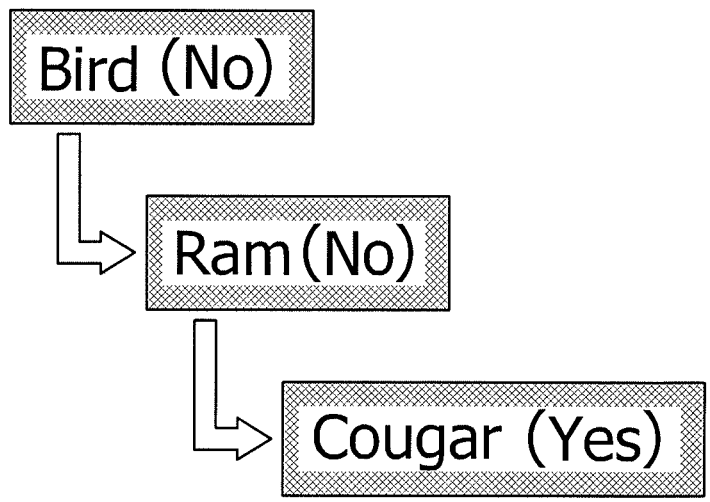
FIG. 6F shows an embodiment of a list entry format SmartItem of the invention as it will be displayed during a test with the variable identified by the shading proceeding up and to the right, the stem identified by the shading proceeding up and to the right, and the answer identified by the cross hatching.
FIG. 6G shows an embodiment of a sequential answer format SmartItem of the invention as it will be displayed during a test with the variable identified by the shading proceeding up and to the right, the stem identified by the shading proceeding up and to the right, and the answer identified by the cross hatching.

FIG. 6F shows a non-limiting embodiment of a type of question of the invention. In such a non-limiting, exemplary format, multiple responses can be linked to the same stem and variable. As a result, there will be more than one correct answer. For such a format, a stem and a variable can be combined to form a question, and the test taker's reply takes the form of a number of numerical and/or textual inputs. Each input is evaluated to determine if that reply matches a correct answer, within a range of tolerance (e.g., spelling).

Sequential Format

FIG. 6G shows a non-limiting embodiment of a type of question of the invention. In such a non-limiting, exemplary format, a stem and variable are combined to form a question. The test taker is then presented with a sequence of possible responses and must select whether the listed response is correct or not. In such a format, the responses presented to the test taker can cease as soon as the test taker identifies a correct answer or may continue to present additional responses for the test taker's evaluation.

Pictorial Format

Figure 6H:
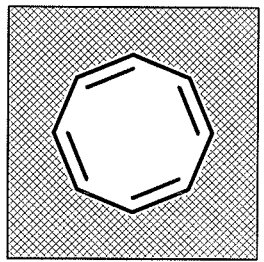
FIG. 6H shows an embodiment of a pictorial entry format SmartItem of the invention as it will be displayed during a test with the variable identified by the shading proceeding up and to the right, the stem identified by the shading proceeding up and to the right, and the answer identified by the cross hatching.

FIG. 6H shows a non-limiting embodiment of a type of question of the invention. In such a non-limiting, exemplary format, a stem and variable are combined to form a question. The test taker's reply must then take the form of selecting a relevant picture or image. The reply is then compared to responses linked to both the stem and variable, and if there is a match, within a range of tolerance, the answer is scored.

Incorporation of Additional Parameters

Series Learning Approach

In an exemplary, non-limiting embodiment of the invention, partial question stems can be tied to additional and sequential question stems to create a series testing approach. Such a linkage may permit for the creation of a unique series of questions. For example, the skill to be tested can be the first law of thermodynamics. Before one can evaluate the first law of thermodynamics, however, an individual must make sure their units are correct. A smart question, for example, on the first law of thermodynamics can first relate to unit conversion, (e.g., converting all stated measurements into SI units). A second smart question can build on this concept and specifically test the test taker's knowledge based on SI units. The test taker's actual knowledge with regard to the first law of thermodynamics and how it is applied is measured. Such an approach provides a more complete measurement of a test taker's knowledge and cognitive function.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A system for creating a secure dynamic test to measure a test taker's knowledge or cognitive function, the system comprising:

a testing server in communication with an external wired and/or wireless communication network, the testing server in communication with a database located at a testing location or a location remote to the testing location through the wired and/or wireless communication network;

a computing device, in communication with the testing server through the wired and/or wireless communication network, the computing device comprising a processor coupled to memory, and a display, executing by the processor; the processor in communication through the wired and/or wireless communication network with a software application, as well as the testing server or a remote server in communication with the testing server through the wired and/or wireless communication network; and the software application that is adapted to transmit to the processor an identification of the knowledge or cognitive function to be measured and to display to the test taker two or more randomly generated complete questions linked to the knowledge or cognitive function to be measured;

the processor is configured to receive the identification of the knowledge or cognitive function to be measured and randomly call up from the database: (1) a first question stem stored in the database and linked to the knowledge or cognitive function, (2) a first variable stored in the database and linked to the first question stem, the first variable configured to be combined with the first question stem to form a first randomly generated complete question, and (3) a plurality of potential responses linked to the first question stem and, optionally, the first variable, the plurality of potential responses also stored in the database, the processor is further configured to: (1) combine the question stem and the variable to form the first randomly generated complete question, (2) determine a correct answer to the first randomly generated question by identifying at least one potential response that is linked to both the question stem and the variable, and (3) communicate to the software application the first randomly generated completed question and, optionally: (i) the correct answer to the first randomly generated question or (ii) at least one potential response that is not linked to the first variable;

whereby the software application is configured to: (1) display the first randomly generated complete question and, optionally: (i) the correct answer to the first randomly generated completed question or (ii) the at least one potential response to the first randomly generated completed question, (2) record a first reply of the test taker, and (3) transmit the first reply of the test taker to the processor; and whereby the processor is configured to receive the first reply of the test taker and randomly call up from the database: (1) a second question stem stored in the database and linked to the knowledge or cognitive function, (2) a second variable stored in the database and linked to the second question stem, the second variable configured to be combined with the second question stem to form a second randomly generated complete question, and (3) a plurality of potential responses linked to the second question stem and, optionally, the variable, the plurality of potential responses also stored in the database, the processor is further configured to: (1) combine the second question stem and the second variable to form a second randomly generated complete question, (2) determine a correct answer to the second randomly generated question by identifying at least one potential response that is linked to both the second question stem and the second variable, and (3) communicate to the software application the second randomly generated completed question and, optionally: (i) the correct answer to the second randomly generated completed question or (ii) at least one potential response that is not linked to the second variable;

whereby the software application is configured to: (1) display the second randomly generated complete question and, optionally: (i) the correct answer to the second randomly generated completed question or (ii) the at least one potential response to the second randomly generated completed question, and (2) record a second reply of the test taker.

2. The system of claim 1 wherein the software application is further configured to request and receive the first reply of the test taker through the wired and/or wireless communication network from the computer device.

3. The system of claim 2 wherein the processor is further configured to compare the first reply of the test taker to the correct answer to the first randomly generated complete question and communicate whether there is or is not a match to the software application.

4. The system of claim 3 wherein the processor is further configured to tally the number of matches between each reply of the test taker and the correct answers and communicate the tally to the software application.

5. The system of claim 3 wherein the software application is further configured to display when the first reply of the test taker matches the correct answer.

6. The system of claim 1 wherein, after a time limit set in the database for a question stem to be answered, the software application stops recording any reply of the test taker.

7. The system of claim 1 wherein the processor is configured to communicate the correct answer to the first randomly generated completed question to the software application, and the software application is configured to display the correct answer to the first randomly generated completed question.

8. The system of claim 1 wherein the first question stem, the first variable, or the correct answer to the first randomly generated completed question is an image without letters or numbers.

9. The system of claim 1 wherein the correct answer to the first randomly generated completed question is a specific area of an image uploaded into the database.

10. A system for creating a secure dynamic test to measure a test taker's knowledge or cognitive function, the system comprising:

a testing server hosting a website in communication with an external wired and/or wireless communication network, the testing server in communication with a database located at a testing location or a location remote to the testing location through the wired aid/or wireless communication network; and a computing device, in communication with the testing server through the wired and/or wireless communication network, the computing device comprising a processor coupled to memory, and a display, executing by the processor a software application that is adapted to transmit to the processor an identification of the knowledge or cognitive function to be measured and display to the test taker two or more randomly generated complete questions linked to the knowledge or cognitive function to be measured, the processor in communication through the wired and/or wireless communication network with the software application, as well as the testing server or a remote server in communication with the testing server through the wired and/or wireless communication network; and the processer is configured to receive the identification of the knowledge or cognitive function to be measured and call up randomly from a database: (1) a first question stem stored in the database and linked to the knowledge or cognitive function, (2) a first variable stored in the database and linked to the first question stem, the variable configured to be combined with the question stem to form the randomly generated complete question, and (3) a plurality of potential responses linked to the question stem and, optionally, the variable, the plurality of potential responses also stored in the database, the processor is further configured to: (1) combine the question stem and the variable to form the first randomly generated complete question, (2) determine a correct answer to the first randomly generated question by identifying at least one potential response that is linked to both the question stem and the variable, and (3) communicate to the software application the first randomly generated completed question and, optionally: (i) the correct answer to the first randomly generated question or (ii) at least one potential response that is not linked to the first variable;

whereby the software application is configured to: (1) display on the website the first randomly generated complete question and, optionally: (i) the correct answer to the first randomly generated completed question or (ii) the at least one potential response to the first randomly generated completed question, (2) record a first reply of the test taker, and (3) transmit the first reply of the test taker to the processor; and whereby the processer is configured to receive the first reply of the test taker and randomly call up from the database: (1) a second question stem stored in the database and linked to the knowledge or cognitive function, (2) a second variable stored in the database and linked to the second question stem, the second variable configured to be combined with the second question stem to form a second randomly generated complete question, and (3) a plurality of potential responses linked to the second question stem and, optionally, the variable, the plurality of potential responses also stored in the database, the processor is further configured to: (1) combine the second question stem and the second variable to form a second randomly generated complete question, (2) determine a correct answer to the second randomly generated question by identifying at least one potential response that is linked to both the second question stem and the second variable, and (3) communicate to the software application the second randomly generated completed question and, optionally: (i) the correct answer to the second randomly generated completed question or (ii) at least one potential response that is not linked to the second variable;

whereby the software application is configured to: (1) display on the website the second randomly generated complete question and, optionally: (i) the correct answer to the second randomly generated completed question or (ii) the at least one potential response to the second randomly generated completed question, and (2) record a second reply of the test taker.

11. The system of claim 10 wherein the software application is further configured to request and receive the first reply of the test taker through the wired and/or wireless communication network from the computer device.

12. The system of claim 11 wherein the processor is further configured to compare the first reply of the test taker to the correct answer to the first randomly generated complete question and communicate whether there is or is not a match to the software application.

13. The system of claim 12 wherein the processor is further configured to tally the number of matches between the reply of the test taker and the correct answers and communicate the tally to the software application.

14. The system of claim 12 wherein the software application is further configured to display when the first reply of the test taker matches the correct answer.

15. The system of claim 10 wherein, after a time limit set in the database for a question stem to be answered, the software application stops recording any reply of the test taker.

16. The system of claim 10 wherein the processor is configured to communicate the correct answer to the first randomly generated completed question to the software application, and the software application is configured to display the correct answer.

17. The system of claim 10 wherein the first question stem, the first variable, or the correct answer to the first randomly generated completed question is an image without letters or numbers.

18. The system of claim 10, wherein the correct answer to the first randomly generated completed question is a specific area of an image uploaded into the database.

19. A method for creating a secure dynamic test to measure a test taker's knowledge or cognitive skills, the method comprising:
receiving a first request for a first randomly generated complete question linked to the knowledge or cognitive function to be measured from a testing server or a remote server placed using a software application operating on a computer device, and wherein the computer device communicates through an external wired and/or wireless communication network with the testing server at a testing location or with the remote server in a location that is remote to the testing location and in communication with the testing server;
upon receiving the first request for a randomly generated complete question, using a processor to randomly call up from a database in communication with the testing server: (1) a first question stem stored in the database and linked to the knowledge or cognitive function, (2) a first variable stored in the database and linked to the first question stem, the first variable adapted to be combined with the first question stem to form a first randomly generated complete question, and (3) a plurality of potential responses linked to the first question stem and, optionally, the first variable, the plurality of potential responses linked to the first question stem also stored in the database;
combining the first question stem and the first variable to form the first randomly generated complete question;
determining a correct answer to the first randomly generated question by identifying at least one potential response that is linked to both the first question stem and the first variable; and
transmitting to the software application the first randomly generated complete question and, optionally: (1) the correct answer to the first randomly generated question, or (2) the at least one potential response to the first randomly generated question;
displaying the first randomly generated complete question and, optionally: (i) the correct answer to the first randomly generated completed question or (ii) the at least one potential response to the first randomly generated completed question;

requesting a second randomly generated complete question, using the processor to randomly call up from a database in communication with the testing server: (1) a second question stem stored in the database and linked to the knowledge or cognitive function, (2) a second variable stored in the database and linked to the second question stem, the second variable adapted to be combined with the second question stem to form a second randomly generated complete question, and (3) a plurality of potential responses linked to the second question stem and, optionally, the second variable, the plurality of potential responses linked to the second question stem also stored in the database;
combining the second question stem and the second variable to form the second randomly generated complete question;
determining a correct answer to the second randomly generated question by identifying at least one potential response that is linked to both the second question stem and the second variable; and
transmitting to the software application the second randomly generated complete question and, optionally: (1) the correct answer to the second randomly generated question, or (2) the at least one potential response to the second randomly generated question.

20. A method for creating a secure dynamic test to measure a test taker's knowledge or cognitive function, the method comprising:
receiving a first request for a first randomly generated complete question linked to the knowledge or cognitive function to be measured with a testing server or a remote server placed through a website accessible using a unique registered user access credential, whereby the first request is placed using a software application operating on a computer device also operating the software application, and wherein the computer device communicates through an external wired and/or wireless communication network with the testing server at a testing location or with the remote server in a location that is remote to the testing location in communication with the testing server;
upon receiving the first request for a randomly generated complete question, using a processor to randomly call up from a database in communication with the testing server: (1) a first question stem stored in the database and linked to the knowledge or cognitive function, (2) a first variable stored in the database and linked to the first question stem, the first variable adapted to be combined with the first question stem to form a first randomly generated complete question, and (3) a plurality of potential responses linked to the first question stem and, optionally, the first variable, the plurality of potential responses linked to the first question stem also stored in the database;
combining the first question stem and the first variable to form the first randomly generated complete question;
determining a correct answer to the first randomly generated question by identifying at least one potential response that is linked to both the first question stem and the first variable; and
transmitting to the software application the first randomly generated complete question and, optionally: (1) the correct answer to the first randomly generated question, or (2) the at least one potential response to the first randomly generated question;
displaying on the website the first randomly generated complete question and, optionally: (i) the correct answer to the first randomly generated completed question or (ii) the at least one potential response to the first randomly generated completed question;

requesting a second randomly generated complete question, using the processor to randomly call up from a database in communication with the testing server: (1) a second question stem stored in the database and linked to the knowledge or cognitive function, (2) a second variable stored in the database and linked to the second question stem, the second variable adapted to be combined with the second question stem to form a second randomly generated complete question, and (3) a plurality of potential responses linked to the second question stem and, optionally, the second variable, the plurality of potential responses linked to the second question stem also stored in the database;

combining the second question stem and the second variable to form the second randomly generated complete question;

determining a correct answer to the second randomly generated question by identifying at least one potential response that is linked to both the second question stem and the second variable; and transmitting to the software application the second randomly generated complete question and, optionally: (1) the correct answer to the second randomly generated question, or (2) the at least one potential response to the second randomly generated question.

\* \* \* \* \*